US012212932B2

(12) United States Patent
Muneer

(10) Patent No.: US 12,212,932 B2
(45) Date of Patent: Jan. 28, 2025

(54) HEARING ASSISTIVE DEVICE HAVING A RECHARGEABLE BATTERY

(71) Applicant: WIDEX A/S, Lynge (DK)

(72) Inventor: Abdul Muneer, Malmoe (SE)

(73) Assignee: Widex A/S, Lynge (DK)

( * ) Notice: Subject to any disclaimer, the term of this patent is extended or adjusted under 35 U.S.C. 154(b) by 18 days.

(21) Appl. No.: 17/779,010

(22) PCT Filed: Nov. 25, 2020

(86) PCT No.: PCT/EP2020/083383

§ 371 (c)(1),
(2) Date: May 23, 2022

(87) PCT Pub. No.: WO2021/115790

PCT Pub. Date: Jun. 17, 2021

(65) Prior Publication Data

US 2022/0417681 A1 Dec. 29, 2022

Related U.S. Application Data

(60) Provisional application No. 62/947,150, filed on Dec. 12, 2019.

(51) Int. Cl.
*H04R 25/00* (2006.01)

(52) U.S. Cl.
CPC ....... *H04R 25/554* (2013.01); *H04R 2225/31* (2013.01); *H04R 2225/51* (2013.01)

(58) Field of Classification Search
None
See application file for complete search history.

(56) References Cited

U.S. PATENT DOCUMENTS

| | | | | |
|---|---|---|---|---|
| 9,024,823 | B2 * | 5/2015 | Bevelacqua | H01Q 9/42 343/702 |
| 9,794,456 | B2 * | 10/2017 | Fu | G07C 5/008 |
| 10,277,061 | B1 * | 4/2019 | Kerselaers | H04B 5/0037 |
| 10,356,537 | B2 * | 7/2019 | Niklaus | H04B 5/0037 |
| 10,667,064 | B2 * | 5/2020 | Ruaro | H04R 25/554 |
| 11,056,920 | B2 * | 7/2021 | Hatanaka | H02J 50/80 |

(Continued)

FOREIGN PATENT DOCUMENTS

| | | |
|---|---|---|
| EP | 2 547 124 A2 | 1/2013 |
| EP | 2 871 863 A1 | 5/2015 |

(Continued)

OTHER PUBLICATIONS

International Search Report for PCT/EP2020/083383 dated Feb. 8, 2021.
Written Opinion for PCT/EP2020/083383 dated Feb. 8, 2021.

*Primary Examiner* — Paul W Huber
(74) *Attorney, Agent, or Firm* — Sughrue Mion, PLLC

(57) ABSTRACT

A hearing assistive device having an antenna component with a common antenna feed with a switching component. The antenna component has a first branch with a first resonance frequency and a second branch with a second resonance frequency. The hearing assistive device switches between a communication state and a wireless charging state. In the communication state a transceiver is connected to the antenna component, and in the wireless charging state a wireless charging unit is connected to the antenna component.

15 Claims, 2 Drawing Sheets

(56) References Cited

U.S. PATENT DOCUMENTS

| | | | | |
|---|---|---|---|---|
| 11,647,341 | B2 * | 5/2023 | Nielsen ................ | H04R 1/1025 381/328 |
| 2010/0202639 | A1 * | 8/2010 | Christensen ........... | H04R 25/60 381/315 |
| 2014/0153760 | A1 * | 6/2014 | Newton ................ | H02J 50/001 381/323 |
| 2016/0050502 | A1 * | 2/2016 | Kvist ................... | H04R 25/554 381/315 |
| 2017/0374477 | A1 * | 12/2017 | Salvatucci ........... | H04R 25/554 |
| 2018/0115055 | A1 * | 4/2018 | Hosadurga ........... | H04R 25/554 |

FOREIGN PATENT DOCUMENTS

| | | |
|---|---|---|
| EP | 3 122 071 A1 | 1/2017 |
| EP | 3 313 096 A1 | 4/2018 |
| EP | 3 493 556 A1 | 6/2019 |

* cited by examiner

HEARING ASSISTIVE DEVICE HAVING A RECHARGEABLE BATTERY

CROSS REFERENCE TO RELATED APPLICATIONS

This application is a National Stage of International Application No. PCT/EP2020/083383 filed Nov. 25, 2020, claiming priority based on U.S. Provisional Patent Application No. 62/947,150 filed Dec. 12, 2019.

The present invention relates to a hearing assistive device having a wireless charging unit for charging a rechargeable battery. More particularly the hearing assistive device is having an antenna component for receiving energy transferred using electromagnetic induction. The invention furthermore relates to a method for operating such a hearing assistive device.

In order to meet customer requirements, the hearing aid business has started a transition towards rechargeable batteries. Most hearing aid users are using their hearing aids all the time from early morning till late evening. Rechargeable batteries are now able to last for a full day use of a hearing aids.

The purpose of the invention is to provide a method of operating a hearing assistive device having a rechargeable battery, wherein electromagnetic energy can be picked up by using a compact structure suitable for hearing assistive devices.

This purpose is achieved by a hearing assistive device comprising an antenna component with a common antenna feed with a switching component. The antenna component comprises a first branch with a first resonance frequency and a second branch with a second resonance frequency. The operation of the hearing assistive device comprises steps of switching between a communication state and a wireless charging state, connecting a transceiver to the antenna component in the communication state, and connecting a wireless charging unit to the antenna component in the wireless charging state. The invention is defined in claims 1, 12 and 17. Preferred embodiments are defined in the dependents claims.

The invention will be described in further detail with reference to preferred aspects and the accompanying drawing, in which.

DETAILED DESCRIPTION

Figure 1:
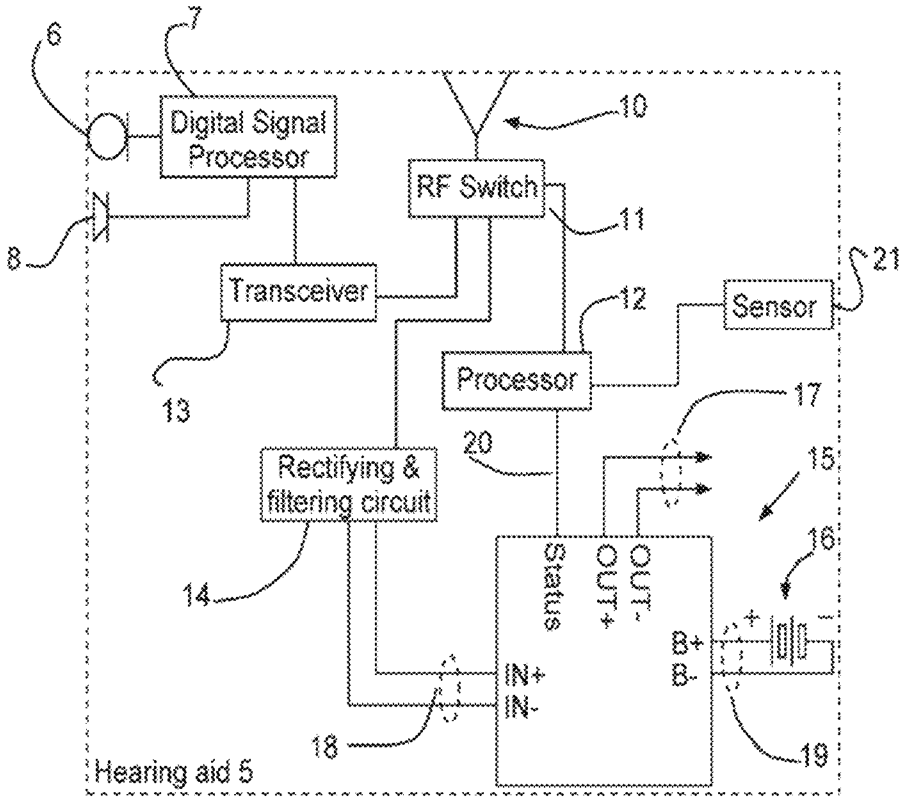
FIG. 1 illustrates schematically the basic electronics of a hearing aid according to one embodiment of the invention.

FIG. 1 illustrates schematically the basic electronics of a hearing aid 5 according to one embodiment of the invention. The hearing aid 5 has at least one input transducer or microphone 6 picking up an audio signal. The audio signal is digitized and fed to digital signal processor 7 adapted for amplifying and conditioning of the audio signal intended to become presented for the hearing aid user. The amplification and conditioning are carried out according to a predetermined setting stored in the hearing aid 5 to alleviate a hearing loss by amplifying sound at frequencies in those parts of the audible frequency range where the user suffers a hearing deficit. The amplified and conditioned audio signal is reproduced for the user via a receiver or speaker 8. The microphone 6, digital signal processor 7, and speaker 8 provides an audio signal path with hearing loss alleviation.

The hearing aid 5 includes an RF switch 11 adapted for connecting an antenna 10 to either a transceiver 13, or a wireless charging unit provided by a rectifying and filtering circuit 14 and a battery controller 15. A processor 12 controls the RF switch 11. In one embodiment, the transceiver 13 is adapted for communication with other devices via a wireless technology standard, e.g. Bluetooth, over short distances. These other devices may include another hearing aid for providing a binaural set of hearing aids, smartphones of streaming, phone conversation or remote control, or dedicated devices like remote microphones, streamers or remote controls.

The hearing aid 5 is adapted for being recharged by inductive charging (wireless charging) when placed in a charging stand or on a charging pad providing an electromagnetic field to transfer energy to the hearing aid using electromagnetic radiation. In one embodiment, the hearing aid 5 just have to be adjacent to the charging pad for charging. A sensor 21 detects when the hearing aid 5 is placed in the charging stand. The sensor 21 may be a magnetic sensor, e.g. a Reed switch operated by an applied magnetic field. The processor 12 receives input from the sensor 21.

The rectifying and filtering circuit 14 converts an alternating current (AC) picked up by the antenna 10, which periodically reverses direction, to direct current (DC) with ripples substantially smoothened. The rectifying and filtering circuit 14 delivers the direct current to the battery controller 15.

The battery controller 15 adapted for controlling the charging and discharging of a rechargeable battery 16. The battery controller 15 is integrated in a hearing assistive device, e.g. a hearing aid 5 shown in FIG. 2. During charging, the charging voltage is delivered via the rectifying and filtering circuit 14 to a set of conductive paths or wires 18 and therefrom to the input terminals IN+ and IN− of the battery controller 15. When the input terminals IN+ and IN− are powered, the hearing assistive device will be in charging state. The output voltage from the rectifying and filtering circuit 14 is connected to IN+ and the IN− terminal is connected to the ground of the rectifying and filtering circuit 14.

The rechargeable battery 16 is in one embodiment a lithium-ion. The rechargeable battery 16 is via a set of conductive paths or wires 19 connected with the positive terminal to a B+ pin of the battery controller 15, while the negative terminal is connected to a B− pin of the battery controller 15. The battery controller 15 acts as a module for controlling the charging and discharging of the rechargeable battery 16, and therefor also for controlling the power supply to the electronic circuits in the hearing aid 5.

In charging state 60 (in FIG. 6) with the hearing aid 5 placed in a charging stand or charging pad, the voltage present on the input pins IN+ and IN− will be passed to the battery pins B+ and B−. The charging process is controlled by the battery controller 15. The charging current of the battery controller 15 depends on size of the rechargeable battery 16. In one embodiment the charging current will be significantly below 1 mA, it can be controlled by adjusting a resistor internally in the battery controller 15. When the battery controller 15 has charged the rechargeable battery 16 completely, it will in one embodiment automatically stop charging. A charging stand will then communicate, e.g. by turning a LED on to the user, that the charging has been completed. The battery controller 15 will then leave charging state and may enter a connected state 61 or a stand-alone state 62 (in FIG. 6). By leaving the charging state, the battery controller 15 will disconnect the input terminals IN+ and IN− from the battery pins B+ and B−.

The battery controller 15 manages the rechargeable battery 16, such as ensuring that the battery 16 operates inside its recommended operating state, and e.g. is calculating secondary data, reporting that data, controlling and authenticating the relevant environment including the charging stand.

In the connected state 61 or the stand-alone state 62, the rechargeable battery 16 will power the electronics of the hearing assistive device. Two output pins OUT+ and OUT− are connected to the circuit to be powered by the rechargeable battery 16 via a pair of conducting paths or wires 17. The OUT+ pin the outputs the positive voltage from the rechargeable battery 16, and the OUT− pin outputs the negative voltage and should be connected to the ground of circuit which has to be powered by the rechargeable battery 16.

The battery controller 15 will monitor the voltage of the rechargeable battery 16 as it powers the electronics of the hearing aid 5 via the wires 17. The battery controller 15 has a status output delivered via a wire 20 to the processor 12.

Figure 2:
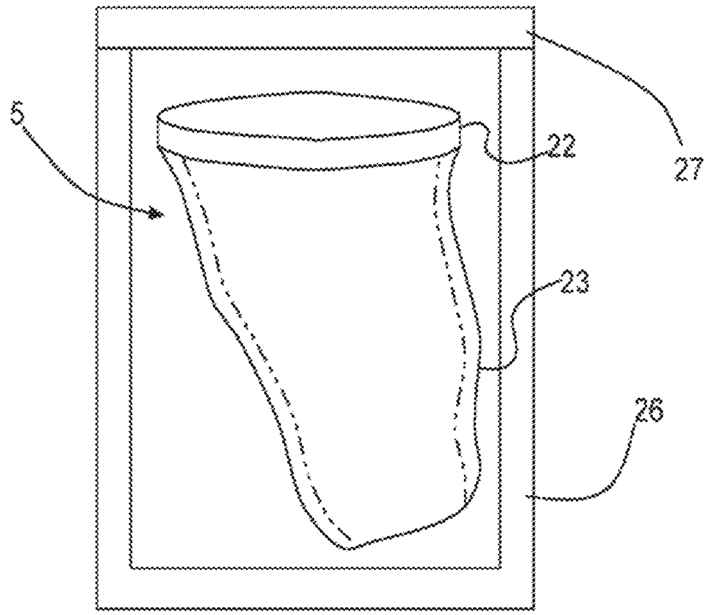
FIG. 2 illustrates a hearing aid according to one embodiment of the invention.

FIG. 2 illustrates a hearing aid 5 according to one embodiment of the invention. The hearing aid 5 is an In-The-Ear (ITE) hearing aid having a custom molded shelf 23 manufactured to fit into the ear canal of the hearing aid user. The invention is in the illustrated embodiment applicable for hearing aids placed in the ear canal, both partly and completely. However, the invention may also be useful for e.g. Receiver-In-Canal (RIC) hearing aids or Behind-The-Ear (BTE) hearing aids. The hearing aid 5 has a face plate 22 with not shown microphone opening for the microphone 6 and not shown control buttons for controlling the operation of the hearing aids 5. The face plate 22 and the custom molded shelf 23 form a cavity in which the electronics of the hearing aid is hosted.

Opposite to the face plate 22, the custom molded shelf 23 has a sound outlet for the speaker 8.

The custom molded shelf 23 may be manufactured in a 3D printing process building a three-dimensional object from a computer-aided design (CAD) model. The 3D printing process relies on successively adding material layer by layer, which is why it is also called additive manufacturing. An example may be Stereolithography in which a light-emitting device selectively illuminate the transparent bottom of a tank filled with a liquid photo-polymerizing resin. The solidified resin is then progressively dragged up by a lifting platform.

The hearing aid 5 is shown as contained in a charging stand having a cavity provided by a container 26 and a lid 27.

Figure 3:
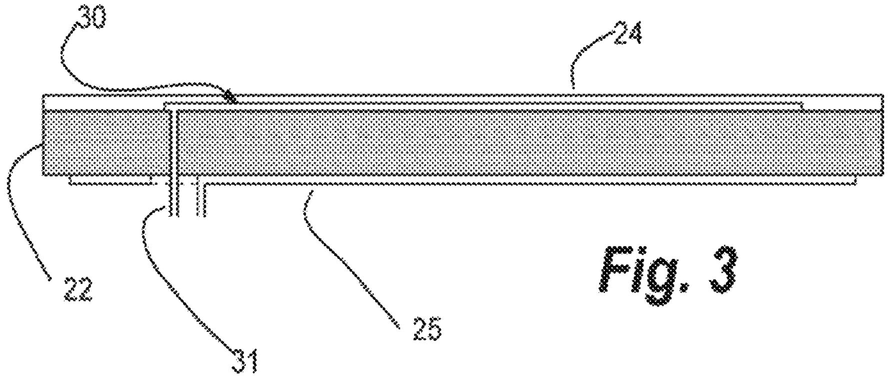
FIG. 3 shows a cross-section of the face plate for a hearing aid according to one embodiment of the invention.
Figure 4:
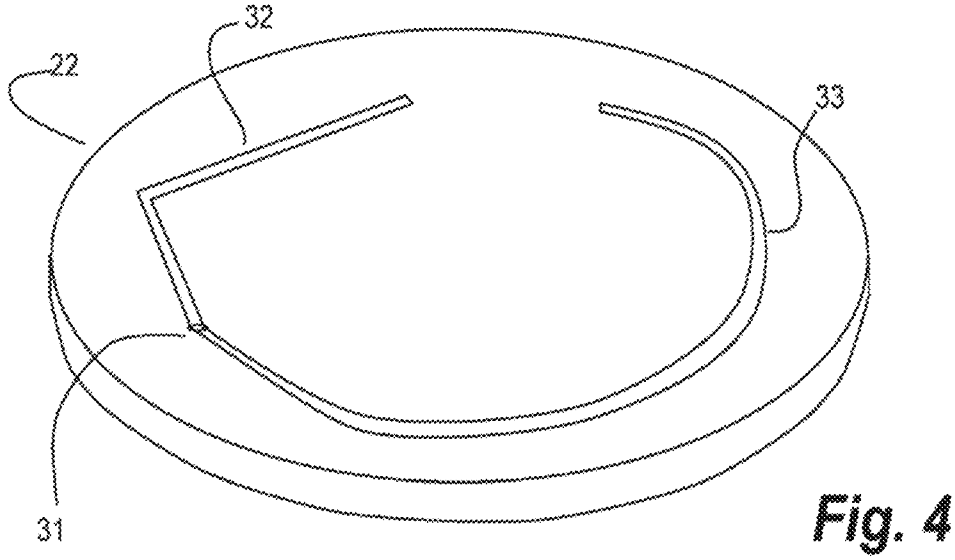
FIG. 4 illustrates schematically the outer surface of the faceplate according to one embodiment of the invention.

The antenna 10, is in the embodiment illustrated with reference to FIG. 3 and FIG. 4 provided on or integrated in the face plate 22. The face plate 22 is manufactured by injection molding an appropriate plastic material, why the face plate 22 will act as a dielectric material. FIG. 3 shows a cross-section of the face plate 22, and on the inner surface, the faceplate 22 is covered by a metallic pattern or layer serving a ground plane 25 for the antenna. In one embodiment, the ground plane 25 covers a significant part (+75%) of the face plate 22 facing towards the cavity in which the electronics of the hearing aid is hosted. On the outer surface of the faceplate 22, there is provided resonating (radiating) antenna elements 30. These antenna elements 30 are connected to the RF switch 11 via an antenna feed 31 passing through the faceplate 22. Finally, the antenna elements 30 are covered by a thin layer 24 of a protective plastic material.

The antenna elements 30 are in one embodiment applied to the face plate 22 in a photolithographic process, where light is used to transfer a geometric pattern from a photomask to a photosensitive chemical photoresist on the faceplate 22 (substrate). In one embodiment, a Laser Direct Structuring (LDS) process employs a thermoplastic material doped with a (non-conductive) metallic inorganic compound, which is activated by means of laser.

In one embodiment the antenna elements 30 is arranged on a separate printed circuit board (e.g. on a flex print) adjacent to the face plate inside the cavity provided by the faceplate 22 and the custom molded shelf 23.

In yet another embodiment, the first branch 32 and the second branch 33 are arranged along a ground plane 25. The first branch 32 and the second branch 33 are arranged on the inner surface of the faceplate 22, and the ground plane 25 is arranged on a printed circuit board inside the hearing assistive device 5.

FIG. 4 illustrates schematically the outer surface of the faceplate 22 and it is that resonating (radiating) antenna elements 30 comprises a first branch 32 and a second branch 33. According to the invention, the first branch 32 has a first resonance frequency adapted for radio communication, and the second branch 33 has a second resonance frequency adapted for wireless charging.

The resonating (radiating) antenna elements 30 provides a single monopole antenna that covers two different frequency bands. These two different frequency bands may include the ISM band at 2.4 GHz used by Bluetooth, and an appropriate frequency for wireless charging. When using a high-frequency resonant tank (e.g. 6.78 MHz) compliant with the Qi technology, it is possible to transmit power over long distances (typically half a meter or more).

The antenna elements 30 operates in one embodiment as a monopole which is a resonant antenna. The monopole operates as an open resonator for radio waves, oscillating with standing waves of voltage and current along its length. Therefore, the length of the antenna is determined by the wavelength of the radio waves it is used with. In one embodiment the monopole is the quarter-wave monopole, in which the antenna is approximately one quarter of the wavelength of the radio waves.

By applying appropriate matching components, including a capacitor and an inductor, it is possible to shorten the physical length of the two branches and obtain the desired electric length. The matching components may be used for antenna tuning. Furthermore, it is possible to cover almost any two frequency bands by the concept according to the invention by changing lengths of the branches and sizes of the matching components.

The lengths of the two branches 32 and 33 may also be changed by using a dielectric material, e.g. the face plate manufactured from a plastic material, for separating branches 32 and 33 from the ground plane 25.

Figure 5:
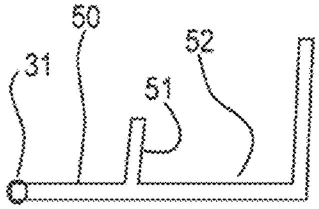
FIG. 5 illustrates a further embodiment of the antenna elements according to the invention.

FIG. 5 illustrates one embodiment of the antenna elements 30, where the antenna feed 31 feeds a first resonating branch 32 comprising a common antenna section 50 and a first stub section 51, and a second resonating branch 33 comprising the common antenna section 50 and a second stub section 52. The two resonating branches do also in this embodiment have resonance frequencies adapted for wireless charging, and radio communication, respectively.

Figure 6:
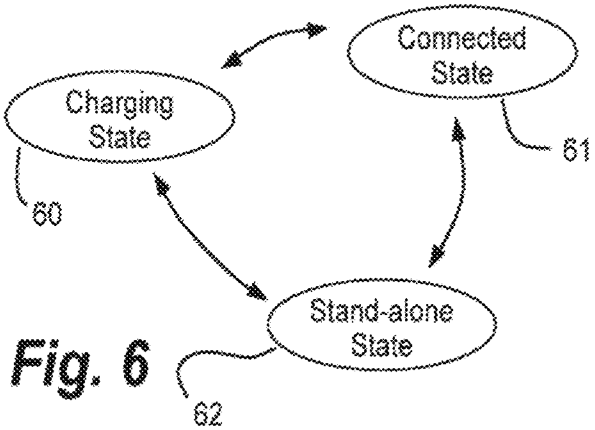
FIG. 6 illustrates schematically a state diagram for a hearing aid according to one embodiment of the invention.

FIG. 6 illustrates schematically a state diagram for a hearing aid 5 according to one embodiment of the invention. The hearing aid 5 has a sensor 21 detecting whether, the hearing aid 5 is placed in the not-shown charging stand or not. Then the processor 12 will instruct the battery controller 15 to start charging the rechargeable battery 16. The processor 12 instructs the RF switch 12 to disconnect the antenna 10 from the transceiver 13 and to direct currents picked up by the antenna towards the rectifying and filtering circuit 14 and further towards the battery controller 15 for charging the rechargeable battery 16.

Once the battery controller 15 informs the processor 12 that the charging of the rechargeable battery 16 has been completed, the processor 12 changes the state of the hearing aid 5 to be either connected state 61 or stand-alone state 62. In one embodiment the hearing aid 5 will enter the stand-alone state 62 and remain there as long as the hearing aid 5 remains in the not-shown charging stand. In the stand-alone state 62 the processor 12 disables the transceiver 13 and disconnects the antenna 10 from the electronics of the hearing aid 5. In case the hearing aid 5 stays in the charging stand 26, 27 for long time, the battery controller 15 will monitor the status of the rechargeable battery 16 and communicate to the processor 12 if recharging is necessary and the charging state 60 must be reentered. Otherwise the hearing aid 5 will automatically change state from stand-alone state 62 to connected state 61 when the sensor 21 detects and communicates to the processor 12 that the hearing aid 5 is no longer placed in the charging stand 26, 27.

According to the invention, the antenna component 30 comprises two branches 32 and 33. In one embodiment, the two branches 32 and 33 are provided as monopole antennas. Monopole antennas constitutes a class of radio antennas consisting of a straight rod-shaped conductor. The driving signal from the transmitter is applied to a feed in the end. The monopole is a resonant antenna, and the rod functions as an open resonator for radio waves, oscillating with standing waves of voltage and current along its length. Therefore, the length of the antenna is determined by the wavelength of the radio waves it is used with. In one embodiment, the two branches 32 and 33 are arranged in parallel with a ground plane 25. Hereby the monopoles operate as inverted-L-antennas.

The inverted-L antenna is a monopole antenna bent over to run parallel to the ground plane. This provides the advantage of compactness and a shorter length than the 214 monopole can be obtained. However, the inverted L antenna has the disadvantage of a very low impedance. An alternative could be to apply an inverted-F antenna which also is very compact and provides impedance matching capability.

The invention claimed is:

1. A hearing assistive device comprising:

an antenna component;

a transceiver coupled to the antenna component via an antenna feed;

a wireless charging unit coupled to the antenna component via the antenna feed;

wherein the antenna component comprises a first branch and a second branch;

wherein the first branch has a first resonance frequency adapted for radio communication, and the second branch has a second resonance frequency adapted for wireless charging; and wherein the hearing assistive device further comprises a processor and a sensor adapted for detecting the presence of a charging stand, wherein the processor is adapted for automatically controlling a switching component based on the sensor detecting and communicating to the processor that the hearing assistive device is no longer placed in the charging stand.

2. The hearing assistive device according to claim 1 wherein the first branch is provided as a first monopole is acting as antenna for the transceiver.

3. The hearing assistive device according to claim 2 wherein the first branch has an electrical length corresponding to a quarter wavelength for the radio communication frequency.

4. The hearing assistive device according to claim 1 wherein the second branch is provided as a second monopole acting as receiving antenna for wireless charging unit.

5. The hearing assistive device according to claim 4 wherein the second branch has an electrical length corresponding to a quarter wavelength for the wireless charging frequency.

6. The hearing assistive device according to claim 1, wherein the sensor is a magnetic sensor.

7. The hearing assistive device according to claim 1, wherein the processor controls a state of operation for the hearing aid, wherein then processor is adapted for:

in a communication state, connecting the transceiver to the antenna component, and in a wireless charging state, connecting the wireless charging unit to the antenna component.

8. The hearing assistive device according to claim 1, wherein the first branch and the second branch comprises a common antenna section.

9. The hearing assistive device according to claim 1, wherein the first branch and the second branch are arranged along a ground plane with a dielectric body separating the first branch and the second branch from the ground plane.

10. The hearing assistive device according to claim 1, wherein the first branch and the second branch are arranged along a ground plane, wherein the first branch and the second branch are arranged on a faceplate of the hearing assistive device, and the ground plane is arranged on a printed circuit board inside the hearing assistive device.

11. A hearing assistive device comprising an antenna component comprising a first branch having a first resonance frequency, and a second branch having a second resonance frequency, and further comprising a processor and a switching component, wherein the processor is adapted for switching between a communication state and a wireless charging state, wherein the processor in the communication state, connects a transceiver to the antenna component, wherein the processor in the wireless charging state, connects a wireless charging unit to the antenna component, and wherein the hearing assistive device further comprises a sensor adapted for detecting the presence of a charging stand, wherein the processor is adapted for automatically controlling the switching component based on the sensor detecting and communicating to the processor that the hearing assistive device is no longer placed in the charging stand.

12. The hearing assistive device according to claim 11, wherein the first branch and the second branch comprises a common antenna section.

13. The hearing assistive device according to claim 11, wherein the first branch and the second branch are arranged along a ground plane with a dielectric body separating the first branch and the second branch from the ground plane.

14. The hearing assistive device according to claim 11, wherein the first branch and the second branch are arranged along a ground plane, wherein the first branch and the second branch are arranged on a faceplate of the hearing assistive device, and the ground plane is arranged on a printed circuit board inside the hearing assistive device.

15. A method of operating a hearing assistive device comprising an antenna component with a common antenna feed with a switching component, the antenna component comprises a first branch with a first resonance frequency and a second branch with a second resonance frequency, wherein the method comprises steps of detecting the presence of a charging stand by means of a sensor, automatically controlling the switching component based on the sensor detecting that the hearing assistive device is no longer placed in the charging stand, switching between a communication state and a wireless charging state, connecting a transceiver to the antenna component in the communication state, and connecting a wireless charging unit to the antenna component in the wireless charging state.

* * * * *